United States Patent [19]

Guillon

[11] Patent Number: 5,007,202
[45] Date of Patent: Apr. 16, 1991

[54] SEALING SLIDEWAY FOR A MOVING SHEET, AND IN PARTICULAR FOR A MOTOR VEHICLE WINDOW

[75] Inventor: Henri Guillon, Vaux-Sur-Seine, France

[73] Assignee: Hutchinson, Paris, France

[21] Appl. No.: 315,301

[22] Filed: Feb. 24, 1989

[30] Foreign Application Priority Data

Feb. 26, 1988 [FR] France .................. 88 02370

[51] Int. Cl.[5] ................... E06B 7/16; F16J 15/22
[52] U.S. Cl. .......................... 49/441; 49/489; 277/184; 277/205; 277/227
[58] Field of Search .............. 277/178, 183, 184, 189, 277/205, 206 R, 227; 49/488, 489, 490, 491, 492, 493, 495, 496, 499, 502, 440, 441; 296/89, 93

[56] References Cited

U.S. PATENT DOCUMENTS

| | | | |
|---|---|---|---|
| 3,286,389 | 11/1966 | Draplin et al. | 49/495 X |
| 4,123,071 | 10/1978 | Yamamoto | 277/205 |
| 4,447,065 | 5/1984 | Dupuy et al. | 277/184 |
| 4,616,446 | 10/1986 | Okamoto | 49/488 X |
| 4,648,207 | 3/1987 | Shibasaki | 49/498 X |
| 4,663,888 | 5/1987 | Okamoto | 49/488 X |
| 4,690,412 | 9/1987 | Tuckley et al. | 277/184 |
| 4,704,820 | 11/1987 | Kisanuki | 49/489 X |
| 4,800,681 | 1/1989 | Skillen et al. | 49/502 X |
| 4,809,463 | 3/1989 | Schröder et al. | 49/491 X |

FOREIGN PATENT DOCUMENTS

| | | | |
|---|---|---|---|
| 194236 | 9/1986 | European Pat. Off. | 296/93 |
| 1955753 | 5/1971 | Fed. Rep. of Germany . | |
| 3442840 | 6/1985 | Fed. Rep. of Germany | 277/184 |
| 1586491 | 2/1970 | France | 49/420 |
| 2551826 | 3/1985 | France . | |
| 1416151 | 3/1972 | United Kingdom | 49/490 |

Primary Examiner—Allan N. Shoap
Assistant Examiner—Scott Cummings
Attorney, Agent, or Firm—Berman, Aisenberg & Platt

[57] ABSTRACT

A guiding slideway for a moving sheet, in particular for a motor vehicle window, the slideway being intended to be mounted in a generally channel-section frame whose flanges terminate in sharp edges, the slideway including two sealing lips connected to two side flanges which are interconnected by a transverse web, wherein said web (20) and its portions connecting it to said side flanges (15) are shaped to constitute a resiliently deformable toggle action linkage which is disposed in such a manner that the slideway can easily be inserted without force into said frame while said slideway is in its rest position, i.e. the position it takes up when no external force is applied thereto, after which said slideway is deformed in such a manner as to lock it into place in the frame merely by pressing against said web in such a manner as to operate said toggle action linkage.

11 Claims, 2 Drawing Sheets

U.S. Patent Apr. 16, 1991 Sheet 1 of 2 5,007,202

SEALING SLIDEWAY FOR A MOVING SHEET, AND IN PARTICULAR FOR A MOTOR VEHICLE WINDOW The invention relates to a sealing and guiding device for surfaces which may move relative to one another, and in particular for the windows of motor vehicles. Such devices are referred to herein as "window slideways", they are generally made of resilient material, e.g. rubber or a plastics material such as PVC, and they are received in metal frame members of generally channel section and serving to hold the slideways.

BACKGROUND OF THE INVENTION

Such guiding slideways are provided not only to perform a guiding function which stems from their very definition, but also to provide sealing between the moving surfaces against external agents, in particular rain, but also noise, and they are also intended to prevent any kind of blade or hook or bent metal wire or other tool for forcing an entry passing round the sides or the top of a window closing a window opening in a car door, and regardless of how thin the tool may be.

A large number of guiding slideways for vehicle windows have been proposed in the prior art in order to solve the combined problem of providing the necessary sealing between the moving surface and its line of contact with the frame or chassis in which it is mounted, while nevertheless allowing the moving surface to slide suitably relative to said frame, when so required. Most prior embodiments, see French Pat. No. FR-A-2 551 826 or German Pat. No. DE-A-1 955 753, for example, essentially comprise two sealing lips carried by a channel section bar made of a material which is harder than the lips, with the lips bearing against respective faces of the window and being coated where they come into contact with the window with a coating that facilitates window sliding, and a similar coating is preferably also disposed over the bottom surface of the slideway where it may come into contact with the edge of the moving surface, which moving surface is referred to below as being a "window" in order to simplify the description even though it should be understood that the invention is not limited to that particular example.

Although the frames on which such slideways have been mounted have included shaped portions at their ends in which the shaped portions of the slideway can be received, with said shapes corresponding appropriately, motor vehicle manufacturers are tending to omit such shaped portions at the ends of frames which are now tending to be merely in the form of channel sections whose flanges terminate with sharp edges. When a slideway is fixed in a frame or chassis by gluing or by force-fitting that takes advantage of the slideway's own resilience, the operation of installing the slideway is relatively lengthy, and above all it is difficult insofar as any installation which is badly done may subsequently lead to the slideway being bodily removed from the frame when the window slides.

A particular object of the present invention is to provide a guiding slideway which ensures excellent sealing, which is extremely easy to install, and which is completely protected against any danger of moving or being removed when the window slides.

SUMMARY OF THE INVENTION

The present invention provides a guiding slideway for a moving sheet, in particular for a motor vehicle window, the slideway being intended to be mounted in a generally channel-section frame whose flanges terminate in sharp edges, the slideway including two sealing lips connected to two side flanges which are interconnected by a transverse web, wherein said web and its portions connecting it to said side flanges are shaped to constitute a resiliently deformable toggle action linkage which is disposed in such a manner that the slideway can easily be inserted into said frame without applying force while said slideway is in its rest position, i.e. the position it takes up when no external force is applied thereto, after which said slideway is deformed in such a manner as to lock it into place in the frame merely by pressing against said web in such a manner as to operate said toggle action linkage.

In a preferred variant of the invention, said web includes a groove running substantially along the middle of its outside face.

In another variant of the invention which is advantageously combined with the preceding variant, grooves are provided where said flanges meet said web.

A slideway in accordance with the invention may also include at least one projection from the outside face of each flange substantially level with the connection between the flanges and the web.

In a preferred embodiment of the invention, the difference between the width of said web and the distance between said flanges when in the rest position is both sufficiently large to ensure that at least a part of the central portion of said web comes into contact with the web of the channel section frame when the slideway is in the locked position, and sufficiently small to ensure that the web of the channel section frame does not exert any substantial reaction against said web of the slideway.

In a preferred embodiment of the invention, the central portion of the slideway web is made of a resilient material which is less hard than the remainder of said web, thereby facilitating locking the slideway in the frame by the toggle effect.

In another preferred embodiment of the invention, which may optionally be combined with the preceding embodiment, the projections on the outside faces of the flanges are constituted by a resilient material which is less hard than the material constituting the flanges from which they project.

In another variant of the invention, which may optionally be combined with the preceding variants, said lips are made of a resilient material of hardness which is different (i.e. less than or greater than) than the hardness of the flanges from which they project, said lips not necessarily having the same hardness as each other.

In another variant of the invention, the slideway is substantially symmetrical about a longitudinal midplane.

The portions of the slideway which come into contact with the window are advantageously provided with a coating for facilitating sliding. In conventional manner, this coating is advantageously made of a plastics material having a low coefficient of friction, e.g. a polyolefin or polytetrafluoroethylene, with the coating being preferably obtained by coextruding the polyolefin or the polytetrafluoroethylene together with the elastomer or the plastomer which constitutes the various portions of the slideway on which the coating is placed.

BRIEF DESCRIPTION OF THE DRAWINGS

An embodiment of the invention is described by way of example with reference to the accompanying drawings, in which.

SUMMARY OF THE INVENTION

Figure 1:
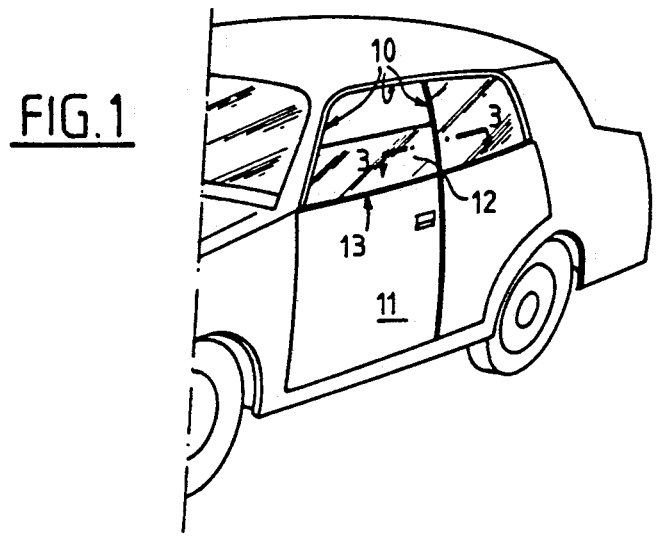
FIG. 1 is a fragmentary perspective view of a car showing an example of an application of the invention.

FIG. 1 shows a portion of a car having a door 11 in which the window 12 is shown in a partially wound-down position. The window opening in the door is sealed against rain, sand, dust, and more generally against any solid, liquid, or gaseous particle or item being inserted and also against soundwaves by means of at least one wiper 13 running along the bottom of the opening, while the sides and top of the window 12 are simultaneously sealed and guided by slideways such as 10 which are fixed in a frame that is generally made of metal channel section frame members of the kind normally found in a vehicle door, except in open-topped cars, in which case at least one of the slideways is generally fixed to a fixed riser.

Figure 2:
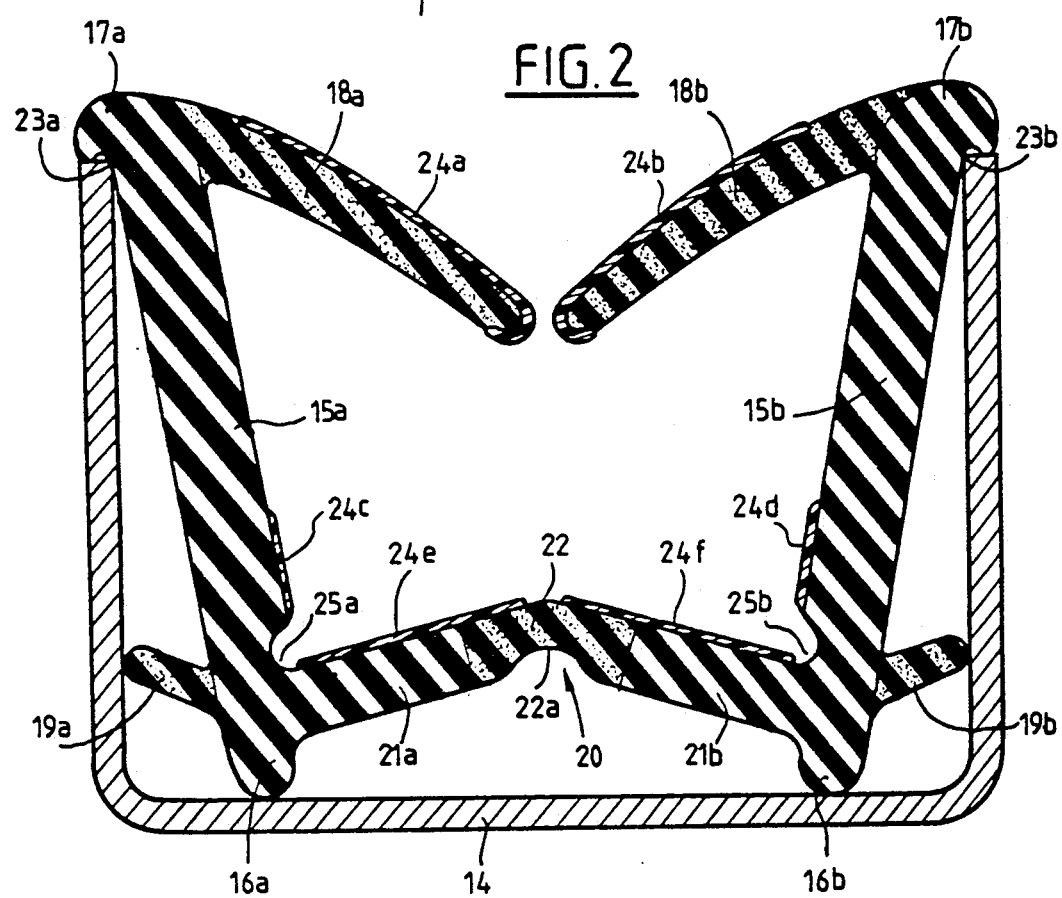
FIG. 2 is a section view on a much larger scale showing the slideway in place in its frame, prior to final installation therein.

FIG. 2 is on an enlraged scale and shows one such frame 14 in which a slideway 10 is shown prior to being locked into position in the frame. In accordance with the invention, the slideway is constituted by:

two flanges 15a and 15b of plastomer or elastomer material such as rubber or PVC having respective ends 16a and 16b resting against the web of the channel section frame 14 and optionally bearing thereagainst when the slideway is locked into place, and having opposite ends 17a and 17b which are further apart than the ends 16a and 16b and which rest against the top portions of the flanges of the channel section frame, and which bear against them when the slideway is locked into place therein;

two sealing lips 18a and 18b made of the same material as the flanges of the slideway, or preferably made of a material of the same type or of a different type but softer than the material of the flanges 15a and 15b, thus making them more easily deformable;

two projections or ribs 19a and 19b likewise made of the same material as the flanges 15a and 15b, or preferably made of a material of the same type or of a different type but which is softer than the flange material, and which is optionally identical to the material used for the lips; and a web 20 interconnecting the two flanges 15a and 15b and connected thereto in the vicinity of their ends 16a and 16b, but offset a little way therefrom (upwards in the orientation shown in the figure), said web comprising two symmetrical side portions 21a and 21b, which in this example are made of the same hard material as the flanges, with the side portions being interconnected by a central portion 2 made of a material which is preferably less hard than the material used for the side portions and including a groove 22a running along its bottom portion (in the orientation of the figure), and more generally along its face which faces the web of the channel section frame 14.

The developed length of the slideway web 20 is greater than the distance between its flanges 15a and 15b where they meet the web of the frame 14, and the side portions 21a and 21b are substantially perpendicular to respective ones of the two slideway webs such that the central portion 22 constitutes a toggle action linkage. When a rod or other tool suitable for being inserted between the lips is pressed briefly against the central portion 22 of the slideway web 20, the web moves from its initial position shown in FIG. 2 to take up the position shown in FIG. 3, and it remains permanently in this new position after the tool has been removed.

Friction between the ends of the projections or ribs 19a and 19b against the flanges of the frame channel section contributes to locking the slideway in the frame 14.

The toggle-effect locking also causes the flanges 15a and 15b of the slideway to rotate about the sharp edges 23a and 23b at the ends of the flanges of the frame 14, and this rotation gives rise to a wedging effect by forcing said edges into the material of the slideway thus reinforcing the locking of the slideway in position.

Figure 3:
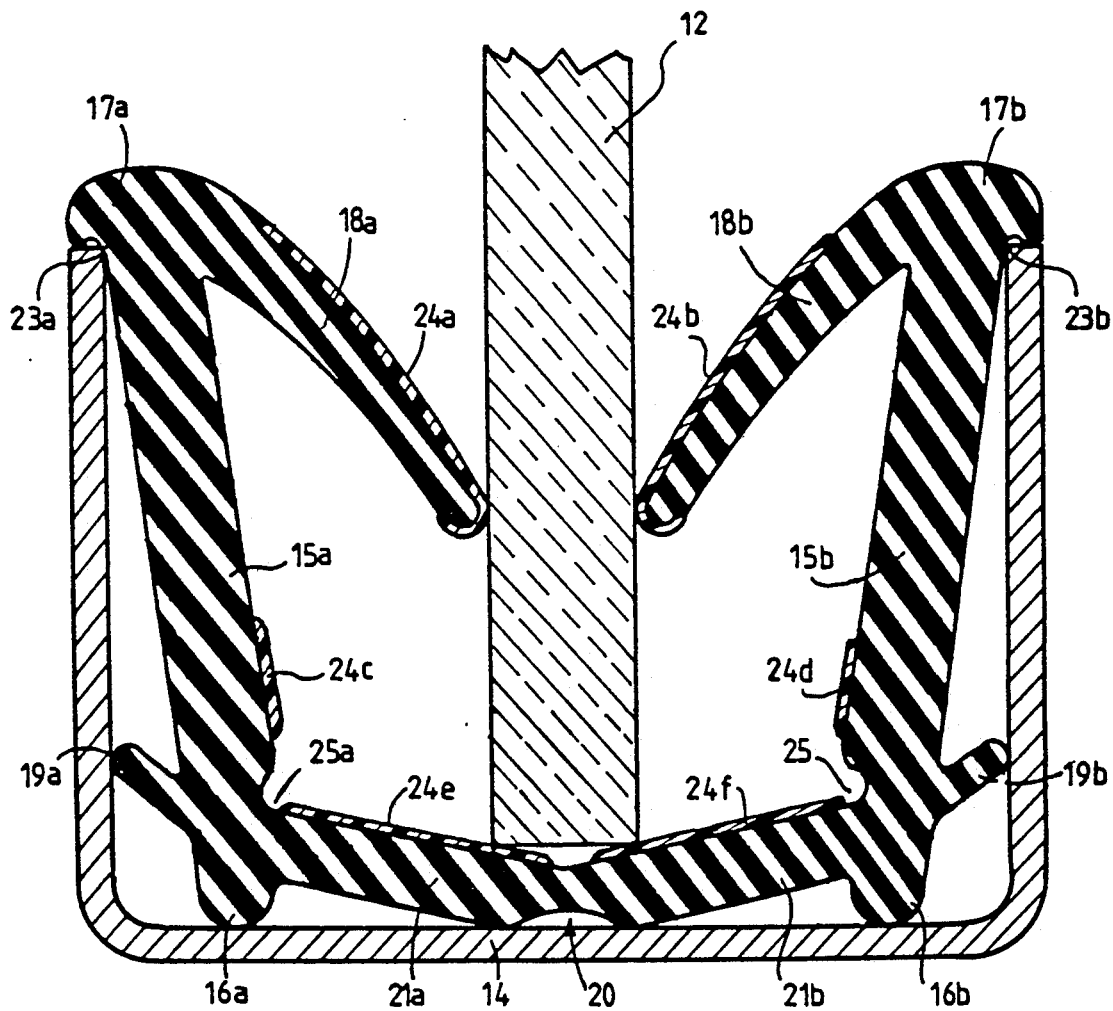
FIG. 3 is a section on the same scale as FIG. 2 and on a line 3—3 in FIG. 1 showing the slideway locked in place in its frame.

The lips 18 and various portions of the flanges 15 and the web 20 which may come into contact with the window or pane 12 are coated with a material which improves window sliding, with said coating being shown at 24a, 24b, 24c, 24d, 24e, and 24f in FIGS. 2 and 3. The coating may be constituted by a polyolefin or by polytetrafluoroethylene, whereas the less hard material (s) used for the lips 18a and 18b, for the central portion 22 of the web 20, and for the ribs 19a and 19b is (are) shown in the form of stippled shading in order to distinguish from the material used for constituting the remainder of the slideway which is preferably (but not exclusively) harder and which is advantageously selected from elastomers and plastomers.

The slideway is preferably made by co-extruding the various materials used, which method makes it particularly easy to obtain longitudinally extending grooves 25a and 25b where the flanges 15a and 15b meet the web 20, and also to obtain the groove 22a in the central portion of the web 20, thereby facilitating the toggle-action effect.

Naturally, the invention is not limited to the embodiment described and shown, nor is it limited to the specific application of providing slideways for car windows. The invention is applicable more generally to any slideway for a moving surface which needs to be held in place in a channel section frame member, particularly one that does not include special slideway-engaging shapes.

The various materials used may be selected over a wide range of possible materials. The materials selected will depend on operating conditions, and, for example, the sliding materials on the two lips could be different if the two faces of the moving surface are different in kind, e.g. if the two faces have been subjected to different surface treatments.

I claim:

1. A guiding slideway for a moving sheet, the slideway comprising two sealing lips connected to two side flanges which are interconnected by a traverse web, wherein said web comprises first and second webs connected to each other at a first end of each web and respectively connected to said side flanges at a second end of each web, said pair of webs forming at their junction an angle projecting towards said lips when the slideway is not locked into a run channel, and forming an angle projecting away from said lips when the slideway is locked into a run channel, wherein the sum of the lengths of said first and second webs is greater than the space allowed for the web within the run channel, whereby the slideway is locked within the run channel by a toggle action when inserted therein.

2. A slideway according to claim 1, wherein said web includes a groove running substantially along the middle of a face of said web, said groove facing toward said run channel.

3. A slideway according to claim 1, further comprising a groove where each of said side flanges meets said second end of each of said webs.

4. A slideway according to claim 1, including at least one projection from the face of each side flange facing toward said run channel substantially level with the connection between the flanges and the web.

5. A slideway according to claim 1, wherein the difference between the width of said web and the distance between said side flanges when the slideway is not locked within the run channel is both sufficiently large to ensure that at least a part of the central portion of said web comes into contact with the web of the run channel when the slideway is locked within the run channel, and sufficiently small to ensure that the web of the channel does not exert any substantial contact reaction against said web of the slideway.

6. A slideway according to claim 1, wherein the central portion of the slideway web comprises a resilient material which is less hard than the remainder of said web, thereby facilitating locking the slideway in the frame by the toggle effect.

7. A slideway according to claim 4, wherein the projections on the outside faces of the side flanges comprise a resilient material which is less hard than the material constituting the side flanges from which said projections extend.

8. A slideway according to claim 1, wherein said lips comprise a resilient material of hardness which is different than the hardness of the side flanges from which they project, and wherein said lips may have the same hardness as each other.

9. A slideway according to claim 1, wherein the slideway is substantially symmetrical about a longitudinal midplane.

10. A slideway according to claim 1, comprising one or more materials selected from elastomers and plastomers.

11. A slideway according to claim 1, including a coating for facilitating sliding formed on at least a portion of said sealing lips, said coating being advantageously provided on at least a portion of the inside faces of the side flanges and the web.

* * * * *